United States Patent [19]
Galperin

[11] Patent Number: 5,888,922
[45] Date of Patent: Mar. 30, 1999

[54] SULFUR TOLERANT CATALYST

[75] Inventor: Leonid B. Galperin, Wilmette, Ill.

[73] Assignee: UOP LLC, Des Plaines

[21] Appl. No.: 648,632

[22] Filed: May 13, 1996

[51] Int. Cl.[6] .................................................. B01J 31/00
[52] U.S. Cl. ............................................. 502/163; 502/62
[58] Field of Search .............................. 502/163, 62, 66, 502/74, 77, 79, 71

[56] References Cited

U.S. PATENT DOCUMENTS

| | | | |
|---|---|---|---|
| 2,620,314 | 12/1952 | Hoekstra .................................. | 252/448 |
| 3,252,892 | 5/1966 | Gleim ....................................... | 208/206 |
| 3,274,124 | 9/1966 | O'Hara ..................................... | 252/451 |
| 3,408,287 | 10/1968 | Urban et al. ............................. | 208/207 |
| 3,909,450 | 9/1975 | O'Hara ..................................... | 252/438 |
| 4,049,572 | 9/1977 | Douglas .............................. | 252/431 N |
| 4,290,913 | 9/1981 | Frame ...................................... | 252/428 |
| 4,456,527 | 6/1984 | Buss et al. ............................... | 208/89 |
| 4,758,419 | 7/1988 | Lok et al. ................................ | 423/306 |
| 4,861,739 | 8/1989 | Pellet et al. .............................. | 502/64 |
| 4,970,188 | 11/1990 | Steinbach et al. ...................... | 502/163 |
| 4,988,659 | 1/1991 | Pecoraro ................................. | 502/235 |
| 5,366,617 | 11/1994 | Bradley ................................... | 208/137 |

*Primary Examiner*—Michael Lewis
*Assistant Examiner*—Thomas G. Dunn, Jr.
*Attorney, Agent, or Firm*—Thomas K. McBride; Frank S. Molinaro

[57] ABSTRACT

A catalyst system is described and claimed which is useful for various hydrocarbon conversion processes and is tolerant to large amounts of sulfur (about 30,000 ppm sulfur) in the feedstream. The catalyst comprises a first component which comprises at least one Group VIII metal dispersed on an inorganic oxide support and a second component comprising a metal phthalocyanine dispersed on an inorganic oxide support. Preferred Group VIII metals are platinum and palladium, while preferred metal phthalocyanines are cobalt or nickel phthalocyanine. Preferred inorganic oxide supports are molecular sieves, aluminas and mixtures thereof.

13 Claims, No Drawings

SULFUR TOLERANT CATALYST

FIELD OF THE INVENTION

This invention relates to a sulfur tolerant catalyst and to hydrocarbon conversion processes using said catalyst. The catalyst comprises a first component comprising at least one Group VIII metal dispersed on an inorganic oxide support and a second component comprising a metal phthalocyanine dispersed on an inorganic oxide support.

BACKGROUND OF THE INVENTION

Noble metal containing catalysts are used in many hydrocarbon conversion processes. One such process is catalytic reforming. Catalytic reforming is carried out using a feedstock containing paraffins and naphthenes. The reactions which take place during reforming include: dehydrogenation of naphthenes to aromatics, dehydrocyclization of paraffins, isomerization of paraffins and naphthenes, dealkylation of alkylaromatics and hydrocracking of paraffins to light hydrocarbons.

It is well recognized that the catalysts used for reforming, e.g., platinum dispersed on zeolites, are sensitive to sulfur in the feedstream. It is known that sulfur poisons the metal catalyst resulting in low activity, selectivity and stability. For example, sulfided metals have a tendency to agglomerate very quickly. Attempts to improve the sulfur tolerance of metal catalysts have had very little, if any, success. For example, U.S. Pat. No. 5,366,617 discloses a reforming catalyst containing a nonacidic L-zeolite, a noble metal and a non-noble Group VIII metal which is concentrated extrinsic to the pores of the zeolite. It is stated that the catalyst has improved activity in the presence of 400 ppb of sulfur. Another reference is U.S. Pat. No. B1 4,456,527 which discloses using a catalyst comprising a large pore zeolite containing at least one Group VIII metal. The sulfur concentration must be below 100 ppb. It is clear from these references that although they claim to have an improved sulfur tolerant catalyst, the improvement is very slight and processes or guard beds must be used in order to reduce the sulfur content in the feedstream from several thousand parts per million to the part per billion range. Accordingly, a strong need exists for a catalyst which can tolerate exposure to sulfur in high concentrations, i.e., 1,000–30,000 ppm.

In reply to this need, applicants have developed a catalyst which shows very good activity even when the feedstream contains about 30,000 ppm of sulfur. This catalyst comprises two components. The first component is a Group VIII metal dispersed on an inorganic oxide support, while the second component is a metal phthalocyanine dispersed on an inorganic oxide support. The two components can be mixed together in one bed or be present as two beds. Which bed the hydrocarbon is contacted with first will depend on the particular process. There is no indication in the art that a combination of a noble metal dispersed on a support and a metal phthalocyanine on a support would result in a hydrocarbon conversion catalyst with superior sulfur tolerance.

SUMMARY OF THE INVENTION

As stated, the present invention relates to a sulfur tolerant catalyst and processes using said catalyst. Thus, one embodiment of the invention is a sulfur tolerant catalyst comprising a first component comprising at least one Group VIII metal dispersed on an inorganic oxide support and a second component comprising a metal phthalocyanine dispersed on an inorganic oxide support.

Another embodiment of the invention is a hydrocarbon conversion process comprising contacting a hydrocarbon stream with a catalyst at hydrocarbon conversion conditions to give a converted product, the catalyst comprising a first component comprising at least one Group VIII metal dispersed on an inorganic oxide support and a second component comprising a metal phthalocyanine dispersed on an inorganic oxide support.

These and other objects of the invention will become more evident after a detailed description of the invention.

DETAILED DESCRIPTION OF THE INVENTION

The first component of the catalyst of the invention comprises at least one Group VIII metal dispersed on an inorganic oxide support. The Group VIII metals are iron, cobalt, nickel, ruthenium, rhodium, palladium, osmium, iridium and platinum. Preferred Group VIII metals are the noble metals which are ruthenium, rhodium, palladium, osmium, iridium and platinum. Especially preferred Group VIII metals are platinum and palladium. The amount of Group VIII metal present on the support can vary from about 0.05% to about 5 wt. % and preferably from about 0.05% to about 2% for the noble metals. For the non-noble metals, the amount varies from about 1 wt. % to about 25 wt. % and preferably from about 3 wt. % to about 20 wt. %. The inorganic oxide support can be any of the supports well known in the art including molecular sieves, aluminas, silica/alumina, silica, titania, calcium oxide and magnesium oxide and zirconia. In order to avoid confusion it is pointed out that the term silica/alumina does not mean a physical mixture of silica and alumina but means an acidic and amorphous material that has been cogelled or coprecipitated. This term is well known in the art, see e.g., U.S. Pat. Nos. 3,909,450; 3,274,124 and 4,988,659. The aluminas which can be used as supports include gamma alumina, theta alumina, delta and alpha alumina.

Molecular sieves are well known in the art and include zeolites and non-zeolitic molecular sieves (NZMS). Zeolites have a three dimensional microporous framework structure made up of $AlO_2$ and $SiO_2$ tetrahedra. Zeolites include both natural and synthetic zeolites, examples of which are faujasites, mordenite, zeolite beta, zeolite L, ZSM-5, ZSM-8, ZSM-11, ZSM-12, ZSM-35. A preferred faujasite is zeolite Y. Molecular sieves that contain elements other than aluminum and silicon have been termed non-zeolitic molecular sieves or by the acronym NZMS. A description of a number of these NZMS compositions is presented in U.S. Pat. No. 4,861,739 which is incorporated by reference. Included among these NZMS compositions are SAPOs (S=silicon); MeAPOs (Me=Fe, Mg, Mn, Co, Zn); MeAPSOs (Me=Fe, Mg, Mn, Co, Zn). A preferred NZMS composition is MAPSO where M is magnesium. MAPSO molecular sieves are disclosed in U.S. Pat. No. 4,758,419 which is incorporated by reference. A preferred MAPSO is MAPSO-31 which means a MAPSO molecular sieve having structure type 31. The supports can be formed in any desired shape such as spheres, pills, cakes, extrudates, powders, granules, etc. and they may be utilized in any particular size. A preferred shape is spherical shape with a preferred particle size of about 1.59 mm in diameter though particles as small as 0.79 mm may also be utilized.

One way of preparing a spherical alumina support is by the well known oil drop method which is described in U.S. Pat. No. 2,620,314 which is incorporated by reference. The oil drop method comprises forming an aluminum hydrosol by any of the techniques taught in the art and preferably by reacting aluminum metal with hydrochloric acid; combining the hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific ageing and drying treatments in oil and ammoniacal solutions to further improve their physical characteristics. The resulting aged and gelled spheres are then washed and dried at a relatively low temperature of about 80° C. to 260° C. and then calcined at a temperature of about 455° to 705° C. for a period of about 1 to about 20 hours. This treatment effects conversion of the hydrogel to the corresponding crystalline gamma alumina. If theta alumina is desired then the hydrogel spheres are calcined at a temperature of about 950° C. to about 1100° C. Calcination is carried out at a temperature of about 1200° C. if alpha alumina is desired.

When molecular sieves are used and shapes such as pills, extrudates, granules are desired, it is necessary (or desirable) to use a binder to prepare the desired shapes. Binders which can be used are well known in the art and include alumina, silica, clays, zirconia and $SiO_2/Al_2O_3$. Usually the molecular sieve and binder are mixed along with a peptizing agent such as HCl, $NHO_3$, KOH, etc. to form a dough. This dough is extruded through a suitably shaped and sized die to form extrudate particles, which are dried and calcined. Calcination is normally carried out at a temperature of about 260° C. to about 650° C. for a period of about 0.5 to about 2 hours.

The Group VIII metal is dispersed onto the support by means well known in the art such as spray impregnation or evaporative impregnation. Both spray or evaporative impregnation use a solution containing a decomposable compound of the desired Group VIII metal. By decomposable is meant that upon heating the compound decomposes to provide the Group VIII metal or Group VIII metal oxide. Examples of decomposable compounds which can be used include chloroplatinic acid, palladic acid, chloroiridic acid, rhodium trichloride, ruthenium tetrachloride, osmium trichloride, iron chloride, cobalt chloride, nickel chloride, iron nitrate, cobalt nitrate, nickel nitrate, rhodium nitrate, ammonium chloroplatinate, platinum tetrachloride hydrate, palladium chloride, palladium nitrate, tetraamine platinum chloride and tetraamminepalladium (II) chloride. The solvent which is used to prepare the solution is usually water although organic solvents such as alcohols, dimethyl formamide (DMF), dimethylsulfoxide (DMSO), tetrahydrofuran (THF) and amines, e.g., pyridine can be used.

Spray impregnation involves taking a small volume of the solution and spraying it over the support while the support is moving. When the spraying is over, the wetted support can be transferred to other apparatus for drying or finishing steps.

One particular method of evaporative impregnation involves the use of a steam- jacketed rotary dryer. In this method the support is immersed in the impregnating solution which has been placed in the dryer and the support is tumbled by the rotating motion of the dryer. Evaporation of the solution in contact with the tumbling support is expedited by applying steam to the dryer jacket. The impregnated support is then dried at a temperature of about 60° C. to about 300° C. and then calcined at a temperature of about 300° C. to about 850° C. for a time of about 30 minutes to about 8 hours to give the calcined catalyst.

The second component comprises a metal phthalocyanine dispersed onto an inorganic oxide support. The inorganic oxide supports which can be used are the same as the ones used in preparing the first component. It should be pointed out that the first and second component support can be the same or different. For example, the Group VIII metal can be dispersed onto a NZMS such as MAPSO-31, while the metal phthalocyanine is dispersed onto alumina.

The metal in the metal phthalocyanine is selected from the group consisting of Group IVB, VB, VIB, VIIB, VIII, IB, IIB metals, gallium, indium, thallium, germanium, tin, lead, antimony, bismuth and mixtures thereof. Specifically the Group IB, IIB, IVB, VB, VIB, VIIB, VIII metals include copper, silver, gold, zinc, cadmium, mercury, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium and platinum. Preferred metals include the Group VIII metals, copper, zinc, vanadium, molybdenum, chromium and tungsten. Especially preferred metals are nickel and cobalt. The phthalocyanine can be either unsubstituted or substituted, e.g., sulfonated. The sulfonated derivates can be the mono-, di-, tri- or tetra-sulfonated compounds. These metal phthalocyanines are easily obtained from commercial sources or may be prepared by means well known in the art such as disclosed in U.S. Pat. Nos. 4,290,913; 4,049,572; 3,408,287 or 3,252,892, all of which are incorporated by reference. For example, the preparation of metal tetrasulfonated phthalocyanines can be found in U.S. Pat. No. 4,049,572. Having obtained the metal phthalocyanine, it is now dispersed onto the support by means similar to the dispersion of the Group VIII metal with the following differences. After drying the catalyst, it is heated in a non-oxidizing atmosphere at a temperature of about 200° C. to about 600° C., preferably about 300° C. to about 500° C. for a time of about 1 to about 6 hours. The amount of metal phthalocyanine present on the support expressed as percent metal on the support varies from about 0.01% to about 5% and preferably from about 0.1% to about 1%.

Having obtained both components of the catalysts, they can be arranged in a number of ways. One arrangement is a physical mixture of the two components. By this is meant that the two components are present on separate particles. The particles of course can be a loose mixture or can be combined and then extruded into cylinders, pellets, pills, etc. Another configuration is where the first component is placed in one catalyst bed and the second component is placed in another bed. The feedstream is flowed through the first component and then through the second component. A third configuration is again where the two components are placed in separate beds, but the feedstream is first flowed through the second component and then through the first component.

A final arrangement is where the first and second components are dispersed on the same support, i.e., same particle. For example, the support can first be impregnated with the metal phthalocyanine and then with the Group VIII metal.

As stated, the present catalyst is useful in the reforming process which is well known in the art and is described in U.S. Pat. No. 5,366,617, which is incorporated by reference. For completeness, a brief description of the reforming process follows. The feedstream to the process will contain paraffins and naphthenes and may also contain aromatics as well as small amounts of olefins. Examples of these feedstocks include straight-run naphthas, natural gasoline, synthetic naphthas, thermal gasoline, catalytically cracked gasoline, partially reformed naphthas or raffinates from extraction of aromatics.

Reforming conditions include a temperature of about 260° C. to about 600° C. and a pressure from about atmospheric to about 6079 kPa. Hydrogen is added to the process to give a ratio of about 0.1 to about 10 moles of hydrogen per mole of hydrocarbon feedstock. Finally, the process is carried out at a liquid hourly space velocity of about 0.5 to about 40 hr$^{-1}$.

The reforming process can be carried out in one reactor or multiple reactors. The feed can be contacted with the catalyst in an upflow, downflow or radial flow mode with radial flow being preferred.

In addition to catalytic reforming, the present catalyst can be used in other processes such as hydroisomerization, dehydrogenation, hydrogenation, hydrocracking and cyclization. Conditions for these reactions are well known in the art and are stated here only for completeness. Hydroisomerization involves treating feedstocks of normal paraffins to produce saturated branched isomers. Hydroisomerization is carried out at temperatures of about 90° C. to about 540° C. and preferably 150° C. to about 510° C. and a pressure of about 205 kPa to about 440 kPa. Hydrogen is added to the reactor usually mixed with the hydrocarbon in a molar ratio of $H_2$/hydrocarbon of about 1 to about 5. Finally, contact time between the feedstock and the catalyst is generally relatively short to avoid undesirable side reactions such as olefin polymerization and paraffin cracking. Accordingly, the liquid hourly space velocity (LHSV) varies from about 0.2 to about 10 hr$^{-1}$.

Hydrocracking is usually carried out at temperatures of about 204° C. to about 440° C., pressures of about 69 kpag to about 24,115 kPag, an $H_2$/hydrocarbon molar ratio of about 2 to about 80 and an LHSV of about 0.1 to about 20 and preferably 1.0 to 10.

Hydrogenation conditions include pressures of about 0 kPag to about 13,789 kPag, temperatures of about 50° C. to about 280° C., $H_2$ to hydrocarbon ratios of about 1.1 to about 1:100 and a LHSV of about 0.1 to about 20.

Dehydrogenation conditions include pressures of about 0 kPag to about 689 kpag, temperatures of about 350° C. to about 650° C., $H_2$ to hydrocarbon ratios of about 1:1 to about 1 :100 and a LHSV of about 0.1 to about 20.

Finally, dehydrocyclization conditions are similar to reforming conditions.

In order to more fully illustrate the invention, the following examples are set forth. It is to be understood that the examples are only by way of illustration and are not intended as an undue limitation on the broad scope of the invention as set forth in the appended claims.

EXAMPLE 1

A MAPSO-31/$Al_2O_3$ support was prepared as follows. In a container 909 g of MAPSO-31, 274 g of alumina (obtained from Catapal, Inc.), 489 g of deionized water and 42.9 g of concentrated $HNO_3$ (70 wt. %) were mixed for 45 minutes at room temperature and then extruded through a plate with 15.9 mm (⅟₁₆ inch) holes. The wet extrudates were dried at 100° C. for 24 hours and calcined in air at 600° C. for 3 hours giving a support with 80 wt. % MAPSO-31 and 20 wt. % $Al_2O_3$.

The support described in the previous paragraph was now impregnated with an aqueous solution containing sufficient $PdCl_2$ to give 1 wt. % Pd on the finished catalyst. The solution was mixed with the support, in a 1:1 volume ratio, in a rotary evaporator and rotated at room temperature for 1 hour, and then heated with steam to evaporate the excess water. The impregnated support was dried at 120° C. for 4 hours and then reduced in an $H_2$/$H_2S$ (8511 5) atmosphere at 410 ° C. for 4 hours. This catalyst was identified as catalyst A.

EXAMPLE 2

Platinum was dispersed onto MAPSO-31 support as follows. An aqueous solution containing sufficient tetraamineplatinum chloride to give 0.4 wt. % Pt on the final catalyst was used to ion exchange platinum onto MAPSO-31 by contacting the solution with the MAPSO-31 powder for a time of about 4 hours at a temperature of about 70° C. The ion exchanged powder was mixed with peptized alumina in a ratio of 80:20 (MAPSO-31 :$Al_2O_3$), the resultant dough was extruded and dried at 120° C. for 8 hours. Next the dried material was calcined in air at 500° C. for 4 hours and then reduced under $H_2$/$H_2S$ (85/15) at 410° C. for 4 hours. This catalyst was identified as catalyst B.

EXAMPLE 3

Alumina spheres were prepared by the method described in U.S. Pat. No. 2,620,314 to provide spheres with an apparent bulk density of 0.55 g/cc and a surface area of about 180 m$^2$/g.

The alumina support was impregnated with an aqueous solution containing sufficient chloroplatinic acid to give 0.4 wt. % Pt (with respect to alumina) as follows. In a rotary evaporator the alumina and solution were mixed in a 1:1 volume ratio, rotated at room temperature for one hour and then heated with steam to evaporate the excess water. The impregnated alumina was dried at 120° C., calcined at 500° C. for 4 hours and reduced in hydrogen at 525° C. for 4 hours. The reduced catalyst was treated at 525° C. with water at a rate of 45 cc/min for 2 hours to remove chloride. After the water treatment the catalyst was dried for 2 hours and then reduced in hydrogen at 565° C. for 1 hour. This catalyst was identified as catalyst C.

EXAMPLE 4

A nickel phthalocyanine catalyst was prepared as follows. Sufficient nickel phthalocyanine to give 0.2 wt. % nickel (percent of support) was dissolved in dimethylsulfoxide (DMSO) and the solution was heated to boiling for 2 hours. The hot solution was filtered and added to alumina support in the shape of particles having diameters of about 250 micrometers (60 mesh) to about 354 micrometers (40 mesh). The mixture was heated to boiling for another 2 hours and then the excess DMSO was filtered or distilled off. The impregnated support was dried in air at 120° C. for 2 hours and then heated in nitrogen at 400° C. for 4 hours. This catalyst was identified as catalyst D.

EXAMPLE 5

A cobalt tetrasulfonate phthalocyanine catalyst was prepared as follows. Sufficient cobalt tetrasulfonate phthalocyanine to give 0.7 wt. % cobalt (percent of the support) was dissolved in deionized water and then added to the alumina support present in the shape of particles having diameters of about 250 micrometers (60 mesh) to about 354 micrometers (40 mesh). Excess water was removed by evaporation and the catalyst was dried in air at 120° C. for 2 hours and then heated in air under nitrogen at 400° C. for 4 hours. This catalyst was identified as catalyst E.

EXAMPLE 6

Some of the above catalysts were tested for the dehydrogenation of methylcyclohexane to toluene using the following test. In a reactor there were placed a total of 250 mg of catalyst present either as two beds or as a physical mixture of the two components, i.e., one bed and the temperature was raised to 325° C. Over this catalyst there was flowed at a rate of 125 cc/min. methylcyclohexane that was saturated with hydrogen at 0° C. Analysis of the effluent was carried out to determine conversion of methylcyclohexane to toluene.

With the same catalyst in place, 10 cc pulses of 500 ppm $H_2S$ in hydrogen were flowed over the catalyst and the conversion measured after 5, 10, 15 and 20 pulses. The results of these tests are presented in Table 1.

TABLE 1

Effect of Sulfur on Dehydrogenation Catalyst Activity

| | | % Conversion | | | | |
|---|---|---|---|---|---|---|
| | | No | No. of $H_2S$ Injections | | | |
| Catalyst I.D. | No. of Beds | Sulfur | 5 | 10 | 15 | 20 |
| A/alpha $Al_2O_3$ | 1 (Phys. Mixt.) | 62 | 30 | 30 | 30 | 30 |
| D | 1 | 0 | — | — | — | — |
| A/D | 1 (Phys. Mixt.) | 78 | 72 | 72 | 72 | 72 |
| A/Ni/$Al_2O_3$ | 1 (Phys. Mixt.) | 35 | 20 | 10 | 10 | 10 |
| A/Ni$P_c$ + $Al_2O_3$* | 1 (Phys. Mixt.) | 20 | 10 | 10 | 10 | 10 |
| A(top)/D(bottom) | 2 | 72 | 72 | 72 | 72 | 72 |
| A(bottom)/D(top) | 2 | 60 | 60 | 60 | 60 | 60 |
| B | 1 | 83 | 55 | 55 | 55 | 55 |
| B/D | 1 (Phys. Mixt.) | 89 | 91 | 92 | 93 | 95 |
| C | 1 | 100 | 42 | 38 | 35 | 35 |
| C/D | 1 (Phys. Mixt.) | 81 | 88 | 90 | 91 | 92 |

*The bed consisted of a physical mixture of catalyst A, unsupported nickel phthalocyanine and alumina.

The results presented above clearly show the beneficial effect of the metal phthalocyanine component. It is observed that the beneficial effect can be obtained by either having the nickel phthalocyanine mixed with the catalyst or having it present as a separate bed. It is also observed that the nickel phthalocyanine must be dispersed onto a support in order to have the beneficial effect and that nickel by itself does not give any beneficial effects.

EXAMPLE 7

A palladium phthalocyanine was prepared by combining 20 g of urea, 20 g of o-phthalonitrile and 6.8 g of $PdCl_2$ and heating the mixture up to a temperature of 280° C. for 4 hours to give the desired product.

This palladium phthalocyanine was deposited onto an alumina support in the manner described in Example 4 for nickel phthalocyanine. The final catalyst contained 0.22 wt. % palladium and was identified as catalyst F.

EXAMPLE 8

A sulfonated nickel phthalocyanine on alumina was prepared in the same way as the cobalt tetrasulfonated phthalocyanine of Example 5. The amount of nickel on the alumina was 0.52 wt. % and this catalyst was identified as catalyst G.

EXAMPLE 9

The catalysts described above were also tested for C-10 hydroisomerization as follows. As in the test in Example 6, two catalysts were placed in a reactor for testing. Each catalyst sample was 5 g and the two catalysts were present either as a physical mixture (one bed) or as two separate beds. A feed containing n-$C_{10}$ plus hydrogen at a ratio of $H_2$/hydrocarbon of 1000 SCFB and 1000 ppm $H_2S$ in hydrogen was downflowed through the catalyst at a LHSV of 25 g/hr and a pressure of 3448 kpag (500 psig). The reactor was ramped up to a certain temperature and lined out at that temperature for 3 hours. At that point the effluent was analyzed by gas chromatography to determine the percent of n-$C_{10}$ converted, i.e., disappearance of n-$C_{10}$ and the selectivity to i-$C_{10}$. Any component having a carbon number less than 10 is a cracked component and undesirable. The results of this test are presented in Table 2. What is presented is selectivity at 50% conversion. Selectivity was stable (±2.5%) within the conversion range of 10–80%.

TABLE 2

Effect of Sulfur on Hydroisomerization Activity

| Catalyst I.D. | No. of Beds | i-$C_{10}$ Selectivity |
|---|---|---|
| B/sand* | 1 | 83 |
| B/sand | 1 | 40 |
| B/$Al_2O_3$ | 1 | 41 |
| B/D | 1 | 75 |
| B/E | 1 | 80 |
| B (bottom), D (top) | 2 | 65 |
| A/sand | 1 | 40 |
| A/D | 1 | 58 |
| B/F | 1 | 69 |
| B/G | 1 | 80 |

*No sulfur in the feedstream

Again the results indicate that metal phthalocyanines greatly increase the sulfur tolerance of both platinum and palladium catalysts.

EXAMPLE 10

In a container 220.6 g of alumina (obtained from Catapal) and 44.7 g of Y zeolite were mixed for 5 minutes and then 93.9 g of deionized water and 11.4 g of concentrated nitric acid (70% $HNO_3$) were added and the dough mixed again for 5 minutes. To this dough 46 cc of cobalt phthalocyanine solution (solution contained 1,000 g per gallon of cobalt phthalocyanine) were added and the dough mixed for another 10 minutes. The resultant dough was extruded through a die plate to give 1.58 mm (1/16 inch) diameter extrudates. The extrudates were dried at 110° C. for 12 hours and then heated in nitrogen for 4 hours at 500° C.

Platinum was dispersed on the support in the same way as in Example 3.

EXAMPLE 11

Catalysts B and E were tested as in Example 9 except that the feed contained 32,000 $H_2S$. The results are presented in Table 3.

TABLE 3

| Catalyst I.D. | No. of Beds | i-$C_{10}$ Selectivity |
|---|---|---|
| B/sand | 1 | 10* |
| B/E | 1 | 37[1] |

*Maximum conversion was 40%.
[1]Selectivity at 50% conversion.

I claim as my invention:

1. A sulfur tolerant hydrocarbon conversion catalyst comprising a first component comprising at least one Group VIII metal dispersed on an inorganic oxide support and a second component comprising a metal phthalocyanine dispersed on an inorganic oxide support.

2. The catalyst of claim 1 where the metal in the metal phthalocyanine is selected from the group consisting of Group IVB, VB, VIB, VIIB, VIII, IB, IIB metals, gallium, indium, thallium, germanium, tin, lead, antimony, bismuth and mixtures thereof.

3. The catalyst of claim 2 where the metal is selected from the group consisting of Group VIII metals, copper, zinc, vanadium, molybdenum, chromium, tungsten and mixtures thereof.

4. The catalyst of claim 1 where each of the inorganic oxide is selected from the group consisting of alumina, zeolites, non-zeolitic molecular sieves (NZMS), calcium oxide, magnesium oxide, silica, silica/alumina, titania, zirconia and mixtures thereof.

5. The catalyst of claim 4 where the inorganic oxide is a zeolite selected from the group consisting of faujasites, zeolite beta, zeolite L, ZSM-5, ZSM-8, ZSM-11, ZSM-12 and ZSM-35.

6. The catalyst of claim 5 where the zeolite is zeolite Y.

7. The catalyst of claim 4 where the NZMS is MAPSO.

8. The catalyst of claim 1 where the first and second component are present as separate catalyst beds.

9. The catalyst of claim 1 where the catalyst is a physical mixture of particles containing the first component and particles containing the second component.

10. The catalyst of claim 1 where the metal phthalocyanine is a metal phthalocyanine sulfonate.

11. The catalyst of claim 1 where the first component is platinum dispersed on MAPSO, the platinum present in an amount from about 0.05 to about 5 wt. %.

12. The catalyst of claim 1 where the second component is cobalt phthalo-cyanine dispersed on gamma alumina, the cobalt present in an amount from about 0.01 to about 5 wt. %.

13. A sulfur tolerant catalyst system comprising a first component comprising platinum dispersed on MAPSO and a second component comprising cobalt phthalo-cyanine dispersed on alumina.

* * * * *